J. M. WOODS.
LOCK FOR AUTOMOBILES.
APPLICATION FILED MAR. 8, 1917.
1,270,911. Patented July 2, 1918.
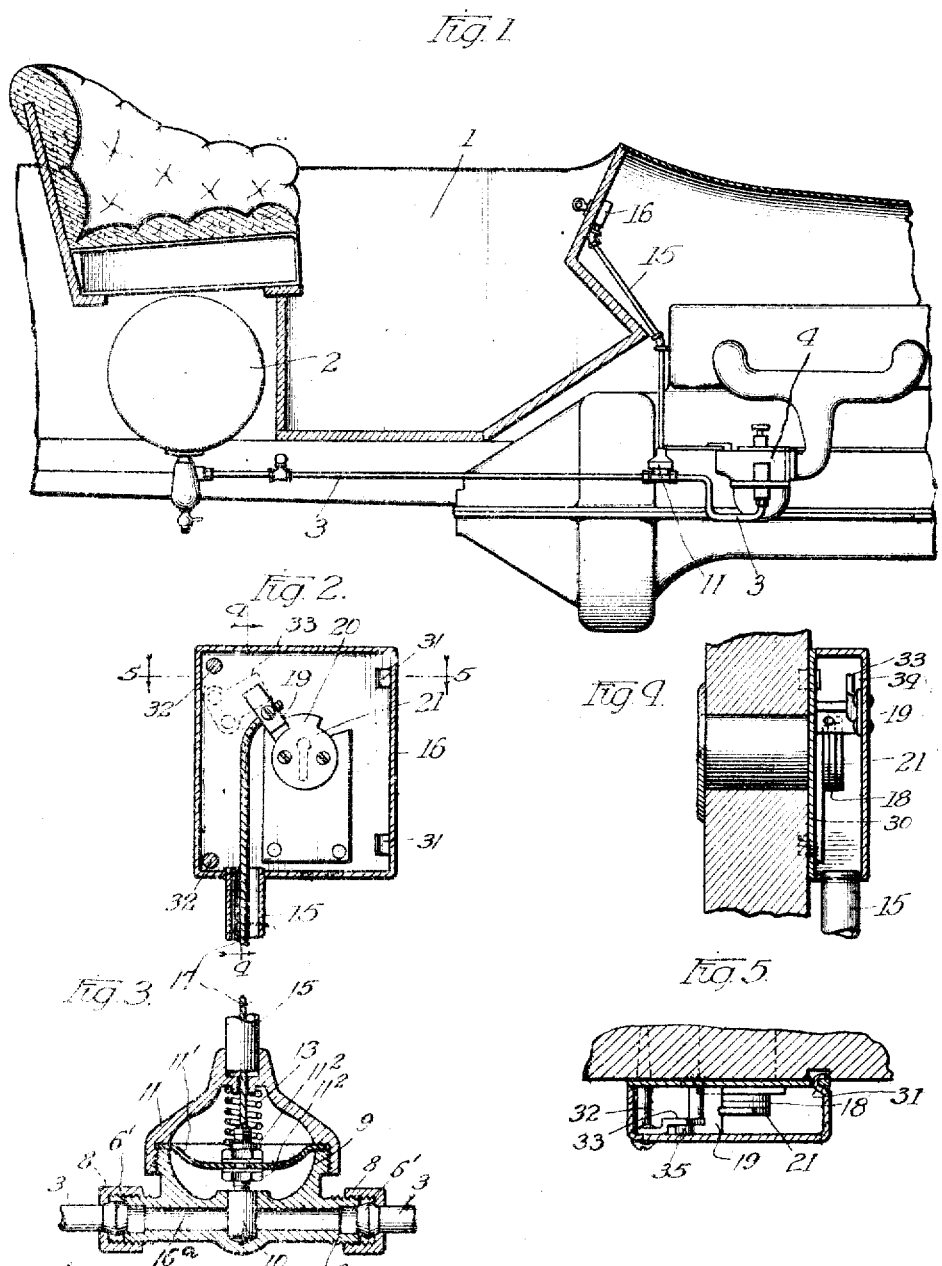

UNITED STATES PATENT OFFICE.

JOSEPH M. WOODS, OF CHICAGO, ILLINOIS, ASSIGNOR TO THE IMPERIAL BRASS MANUFACTURING COMPANY, OF CHICAGO, ILLINOIS, A CORPORATION OF ILLINOIS.

LOCK FOR AUTOMOBILES.

1,270,911.   Specification of Letters Patent.   Patented July 2, 1918.

Application filed March 8, 1917. Serial No. 153,272.

*To all whom it may concern:*

Be it known that I, JOSEPH M. WOODS, a citizen of the United States, residing at Chicago, in the county of Cook and State of Illinois, have invented certain new and useful Improvements in Locks for Automobiles, of which the following is the specification.

This invention relates to locking devices for automobiles, and particularly to a locking device adapted to control the fuel supply to the automobile.

It is an object of the invention to provide a locking device for automobiles which will absolutely prevent the flow of any fuel to the carbureter when in locked position, which may be placed at any point in the fuel supply line, and which will act automatically if tampered with to cut off the fuel supply.

Other objects and advantages of the invention will appear as the description to follow proceeds.

In the drawings:—

Figure 1 is an elevation partly in cross section of an automobile equipped with my invention;

Fig. 2 is an elevation of the lock controlled portion of the invention, in cross section;

Fig. 3 is a cross sectional elevation of the valve in the fuel supply;

Fig. 4 is a cross sectional view on line 4—4 of Fig. 2.

Fig. 5 is a top plan view in cross section on the line 5—5 of Fig. 2.

In the drawings, 1 represents in general the body of an automobile provided with a fuel supply tank 2, from which the supply pipe 3 leads to the carbureter 4. Inserted in the fuel supply pipe 3 is a casting 6 having a passage $16^a$ therethrough terminating preferably in conically tapering seats with which the ends of the interrupted pipe 3, which are provided with double conical shoulders 6', coöperate, and which are secured in place liquid tight by threaded collars 8. The casting 6 includes an upstanding externally threaded casing 9 integrally formed therewith, which at its center is provided with a cylindrical bore extending downwardly through the passage $16^a$ and in which operates the valve 10, adapted when in lowered position, as shown in Fig. 3, to prevent the flow of fuel through the passage $16^a$. The internally threaded cap 11 is screwed on the casing 9, and clamped between them is the edge of the circular leather washer 11' fastened to the threaded shank of the valve 10 by nuts $11^2$. This prevents the leakage of gasolene. A coil spring 13 bears at one end upon the under surface of the top of the cap 11 and at its other end upon the upper one of the nuts $11^2$, tending to force this valve into its fuel interrupting position. A pipe 15, which may if desired be a flexible, helically coiled armored pipe such as is common and well known, but which is shown as an ordinary brass pipe, is firmly secured, as by solder, to the top of the cap 11 and extends therefrom into the casing 16 secured to the dash. A flexible connector 17 extends from the valve 10 through the pipe 15 into the casing 16. In the casing 16 is located the lock, which is preferably a key-controlled tumbler lock from which the bolt has been removed and in which a collar 18 is loosely mounted upon the rotary shank and equipped with a projecting lug or shoulder 19 which extends into the path of the lug 20 upon the key-rotated element 21 of the lock, which in the ordinary lock construction operates the bolt. The flexible connector 17 is connected to the lug 19 so that when the lock is turned into one of its two locked positions, one of the shoulders of the lug 20 will have impinged behind the lug 19, pulling this lug in a clockwise direction as viewed in Fig. 2 to pull up the flexible connector 17 and open the fuel passage $16^a$.

It is to be noted particularly that inasmuch as the valve normally cuts off the fuel supply which the lock holds open, cutting off the pipe 15 would cut the connector 17 therein and serve to lock the automobile. The natural resilience of the connector 17 and the action of the spring 13 serve, if it be cut with the pipe 15, to draw the lower end of the connector 17 as much as six inches down the pipe.

A combination lock might be substituted for the key lock disclosed, but I prefer the key lock as simpler and quicker in operation.

It is an important feature of the invention that the locking device which I have shown upon the dashboard of the automobile need not be placed there but may obviously be placed underneath the seat, or in any inaccessible point desired by the owner of the car, this device being simply connected to the cutoff valve by a flexible connector, which may be incased as above described in a helical pipe or other suitable protection so that the lock may be placed anywhere desired quite independent of the position of the cutoff valve in the fuel supply pipe, and similarly, of course, the cutoff in the fuel supply pipe may be placed at any desired point.

The lock casing is made up of a base plate 30 screwed to the dash and provided with apertures, in which are inserted the inwardly projecting curved hinge lugs 31 of the casing 16, which is hinged thus at one side and fastened by screws 32 at the other. On the inside of the casing 16 is a lug 33, riveted thereto and forming a slot or seat 34 and integrally formed with the block 19 is an arm 35 which fits in said slot when the gasolene supply is shut off. By this means it is rendered impossible to remove the lock casing when the car is locked, while the attachment thereof to the dashboard is simplified.

While I have shown and described my invention as embodied in the form which I at present consider best adapted to carry out its purposes, it will be understood that it is capable of some modification, and I do not desire to be limited in the interpretation of the following claims except as may be necessitated by the state of the prior art.

Having now described my invention, I claim:

1. A locking device for automobiles, comprising a casing having a passage adapted to be inserted in a fuel line supply, a valve adapted to move to open and close said passage, a flexible connector connected at one end with said valve and at its opposite end with a lock, mounted in a convenient place on the automobile, a flexible diaphragm connected to said valve and so arranged as to permit the movement of said valve to open and close said passage, and a compression spring on the upper side of said diaphragm for automatically returning the valve to closed position when the connector is permitted to move.

2. A locking device for automobiles, comprising a casing provided with a passage to be inserted in a fuel line supply, a valve in said casing adapted to move to open and close said passage, a leather diaphragm in said casing connected to and adapted to move with said valve and so arranged as to permit the valve to move to open and close the passage, means for withdrawing said valve from said passage, a lock connected with said means, and a spring between said diaphragm and casing for automatically returning said valve to closed position when it is released.

3. A locking device for automobiles, comprising a casing provided with a passage adapted to be inserted in a fuel supply line, a valve in said casing adapted to move to open and close said passage, a flexible diaphragm tightly connected to said casing and valve and adapted to move with the latter, a connector connecting with said valve for withdrawing the same from said passage, a lock for locking said valve in open position, and means between said diaphragm and casing for automatically returning said valve to closed position when said connector permits its movement.

4. A locking device for automobiles, comprising a casing provided with a passage adapted to be inserted in a fuel line supply, a valve in said casing adapted to move to open and close said passage, a diaphragm within said casing, a flexible connector connected at one end with said valve and at the other end with a lock conveniently mounted on the automobile, and means in said casing for automatically returning said valve to its closed position when said connector permits its movement.

5. A locking device for automobiles, comprising a casing having a passage adapted to be inserted in a fuel line supply, a valve arranged to move therein to open and close said passage, a valve stem extending upwardly from said valve, a flexible connector connected at one end with said valve stem and at its opposite end with a lock mounted in convenient position on the automobile, a chamber in said casing, a flexible diaphragm in said chamber and arranged to permit the movement of said valve relative to said passage, a nut on said stem on each side of said diaphragm to secure said diaphragm to said stem, and a compression spring engaging the roof of said chamber, and pressing down on the upper nut automatically to return said valve to closed position when the connector is released.

In witness whereof, I hereunto subscribe my name to this specification in the presence of two witnesses.

JOSEPH M. WOODS.

Witnesses:
SEBASTIAN NEWTON,
C. I. SHERMAN.